US008271349B1

(12) United States Patent
Mathog

(10) Patent No.: US 8,271,349 B1
(45) Date of Patent: *Sep. 18, 2012

(54) LEAD GENERATION BUILDING, OPTIMIZATION, MANAGEMENT AND TRACKING TOOL

(75) Inventor: Mike Mathog, San Francisco, CA (US)

(73) Assignee: Vinyl Interactive, LLC, San Francisco, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/534,121

(22) Filed: Aug. 1, 2009

Related U.S. Application Data

(63) Continuation-in-part of application No. 11/843,578, filed on Aug. 22, 2007, now Pat. No. 7,848,949.

(60) Provisional application No. 61/085,824, filed on Aug. 1, 2008.

(51) Int. Cl.
*G06Q 30/00* (2012.01)

(52) U.S. Cl. .................. 705/26.4; 705/26.1; 705/26.41; 705/27.1; 705/37

(58) Field of Classification Search ......... 705/26.1–27.2
See application file for complete search history.

(56) References Cited

U.S. PATENT DOCUMENTS

| | | | | |
|---|---|---|---|---|
| 6,865,545 B1 * | 3/2005 | Epstein et al. | ............. | 705/14.26 |
| 7,363,254 B2 * | 4/2008 | Skinner | ...................... | 705/14.73 |
| 7,801,784 B2 * | 9/2010 | Bandman et al. | ................ | 705/35 |
| 8,046,265 B2 * | 10/2011 | Van Luchene et al. | ...... | 705/26.1 |
| 2009/0210316 A1 * | 8/2009 | Chu et al. | ......................... | 705/26 |

OTHER PUBLICATIONS

"Next-Generation Trading in Futures Markets: A Comparison of Open Outcry and Order Matching Systems." Bruce W. Weber. Journal of Management Information Systems: Fall 1999; 16, 2; ABI/INFORM Global. p. 29. Retreived via ProQuest on Jul. 2, 2012.*

* cited by examiner

*Primary Examiner* — Michael Misiaszek
(74) *Attorney, Agent, or Firm* — Law Office of Austin Bonderer; Austin Bonderer

(57) ABSTRACT

The present invention allows users to quickly develop web pages, or offers, to meet their advertisers' individual needs; mange the offers and inventory; and prioritize the order in which the offers are displayed. Functions included in the invention allow the user to internally monitor performance of marketing campaigns. The invention also has the ability to automatically prioritize which offers are to be displayed to users and in what order they will appear based upon the number of orders outstanding from an advertiser, the revenue generated from each conversion, the conversion rate of each offer, and a manual factor inserted based upon the business priority. The current invention allows the user to effectively and efficiently run a business where the user is required to set up offers for individual advertisers and maintain an effective balance of priority based upon business concerns, revenue, inventory of offer and conversion rates.

19 Claims, 23 Drawing Sheets

Fig. 3

Step 1: Create Offer

1. Duplicate the offer by clicking on link

2. Post Type will either be "HTTPGET" or "HTTPPOST"

3. Lead Type will either be:
   - RT (Real Time) ~90%
   - Batch
   - IFrame

4. Modify all other Offer Details based upon posting docs

Fig. 4

Step 2: Build Fields

1. Enter Field Names (Vinyl nomenclature – doesn't change)
2. Enter Question/Prompt based upon posting docs (what user sees as prompt on the form)
3. Modify order fields should appear in the form
4. Check "Required Order" if field is required
5. Check "Edit" to save changes to a field

OFFER FIELDS FOR OFFER ID 96

| OFFER FIELD ID | FIELD NAME | QUESTION/PROMPT | GUI TYPE | FIELD DESC ID | DISP ORDER | REQUIRED ORDER | | | |
|---|---|---|---|---|---|---|---|---|---|
| 2617 | program | Program of Interest | pulldown | 111 | 1 | ☑ | Edit | Remove | View Options |
| 2618 | college_credits | How many credits have you previously | pulldown | 1878 | 2 | | edit | Remove | View Options |
| 2619 | firstname | First Name | textfield | 112 | 4 | ☑ | Edit | Remove | View Options |
| 2620 | lastname | Last Name | textfield | 113 | 5 | ☑ | Edit | Remove | View Options |
| 2621 | email | Email | textfield | 114 | 6 | ☑ | Edit | Remove | View Options |
| 2622 | address1 | Address | textfield | 115 | 7 | ☑ | edit | Remove | View Options |

Step 3: Load Field Options

FIG 5

1. Click "View Options" to modify the different field options for

2. Modify field options in one of 3 ways:
   - Manually on form
   - HTML in free form box
   - Comma delimited in free form box 3. Clicking "Generate Options" will overwrite all existing fields

| PROMPT | GUI TYPE | FIELD DESC ID | DISP ORDER | REQUIRED ORDER | |
|---|---|---|---|---|---|
| nterest | pulldown | 111 | 1 | ☑ | Edit / Remove / View Options |

OPTIONS FOR FIELD NAME: COLLEGE_CREDITS check all | clear all

BACK TO OFFER FIELD MANAGE

| Check to Enable | Field Name | Field Value | Field Text/Display | Select Action |
|---|---|---|---|---|
| ☐ | college_credits | 0to23 | 0 to 23 | ---Select action--- |
| ☐ | college_credits | 24to47 | 24 to 47 | ---Select action--- |
| ☐ | college_credits | 48ormore | 48 or more | ---Select action--- |
| ☐ | college_credits | | | ---Select action--- |

+ ADD NEW OPTION

[Generate Options]

Step 4: Modify Offer Field Template

Fig. 6

1. If behavior of an offer field is not standard, modification may be needed on THAT OFFER'S field template 2. YOU MUST add the offerid to the global template URL 3. Modify template using HTML & JavaScript 4. For Geo target offers, "State" and "Zip" fields should not be visible. Enter an "a" in the Smarty Code box for each field to break the Smarty function and therefore not display the fields.

Step 5: Assign Field Mappings

Fig. 7

1. Select campaign associated with offer

2. Per the posting docs, map the advertisers field names to VI's field names in the format::
Adv. Field = %VI Field%

3. If offer is run on multiple campaigns, create a mapping for each campaign, changing only the Affiliate ID

| General | Fields | Mappings | Template | Validation |

Mapping Data - separate each mapping key by newline

Select campaign : -Default-

```
offer=87
affiliate=126
address=%address1%
city=%city%
country=%country%
dedicated=%survey1%
email=%email%
first_name=%firstname%
last_name=%lastname%
level_of_education=%edulevel%
opinion=%survey2%
phone=%home_areacode%-%home_prefix%-%home_suffix%
program=%program%
state=%state%
zip=%zipcode%
time_zone=%timezone%
work_phone=%work_areacode%-%work_prefix%-%work_suffix%
```

FIELDS
- program
- edulevel
- firstname
- lastname
- address1
- city
- state
- zipcode
- country
- email
- home_areacode
- home_prefix
- home_suffix
- work_areacode
- work_prefix

Step 7: Include Validation (if necessary)

1. This action is needed only if certain field values are not allowed in combination with other field values (per posting instructions)

2. For all validation rules, write out full PHP to handle the validation

3. Form will not "Submit" unless user's selections pass validation

Step 8: Test & Launch

Fig. 10

1. Enter testing URL (could be the same as the live one) is in the "Offer Posting URL" field
2. Send test lead to advertiser
3. Once accepted, modify "Success Code" field to match what the advertiser sends back to Vinyl on successful lead
4. Ensure "Offer Posting URL" is accurate for live leads Admin System: Inventory Management            FIG 14 a

Purpose: Interface for entering and managing offer inventory

BUSINESS DEVELOPMENT SECTION

INVENTORY

| | |
|---|---|
| Pricing Type | Single |
| Num Leads | 5000 |
| CPA | 2.00 |
| Start Date | |
| Daily Cap | 300 |
| Campaign | YourGreatGiveaway |
| Comments | |

CAMPAIGN ENABLEMENT fcs: ☐  gyd: ☐  sp: ☐  coreg: ☐  ygg: ☑
ecar: ☐  dpost: ☐

[Cancel]  [Edit Item]  [Delete Item]

CURRENT - CLICK DATE TO EDIT.

| DATE | TOTAL LEADS | CPA | CAMPAIGN |
|---|---|---|---|
| 2006-08-01 | 5000 | 2.00 | YourGreatGiveaway |

HISTORICAL - CLICK DATE TO VIEW.

| DATE | TOTAL LEADS | CPA | CAMPAIGN |
|---|---|---|---|
| 2006-07-27 | 10000 | 2.00 | YourGreatGiveaway |

Users will enter "offer inventory" for the month

TECHNICAL SECTION

Enabled:  ⦿ Yes  ◯ No
Comments

[Update]

FIG 14 b

INVENTORY SHEET

LEGEND

☑ ID: Offer ID ☑ AC: Advertiser Code ☑ ADV: Advertiser Name ☑ O: Offer Name ☑ C: Campaign Name ☑ EPL: Earnings Per Lead ☑ I: Inventory For Month ☑ LG: Leads Generated ☑ DC: Daily Cap ☑ LT: Leads Today ☑ IN: Income Generated ☑ OT: Offer Type ☑ GEO: Geo Targeted Users can disable an offer by product (campaign)

Offers will "tech" disable automatically after 10 consecutive failures

| Inventory ▼ | Campaigns ▼ | | All Advertisers ▼ | This Month ▼ | All Users ▼ | | | | | |
|---|---|---|---|---|---|---|---|---|---|---|
| Inventory Leads Generated Leads Left Total Income | | | | | Create Report | Create CSV | | | | |
| ID | AC | ADVERTISER | | OFFER | CAMPAIGN | S | EPL | I | LG | DC |
| 1025 | | ACME Media | ABC College | SAMPLE DATA | yyy-specific | tech | $2 | 5,000 | 13 | 300 |
| 966 | | ACME Advertising | My School | | yyd-specific | tech | $23 | 20 | 0 | 20 |

1. Report by Advertiser                                         Fig 15

Layout of "Report by Advertiser" as generated today in the Access report:

| | | CPL | Daily Cap | Inventory | Leads To Date | Leads Left Act | Leads Left Proj | Performance ROI | Performance Index |
|---|---|---|---|---|---|---|---|---|---|
| Inventory Projections 3/24/2006 | | *Existing data fields* | | | | *Calculated fields* | | | |
| advertising.com | | | | | | | | | |
| 457 | University of Phoenix | $25.00 | 300 | 880 | 622 | 258 | 258 | 64.2 | 2.99 |
| 610 | University of Phoenix Online | $12.00 | 400 | 1,600 | 831 | 769 | 769 | 34.01 | 1.58 |
| azoogle | | | | | | | | | |
| 244 | American Intercontinental University | $12.50 | 500 | 1,000 | 1,003 | 0 | 0 | 0 | 0 |
| Beyond Interactive | | | | | | | | | |
| 410 | University of Maryland | $14.00 | 200 | 2,385 | 2,390 | 0 | 0 | 0 | 0 |
| collegeanduniversity | | | | | | | | | |
| 105 | Westwood College | $23.00 | 100 | 2,000 | 787 | 500 | 500 | 29.08 | 1.35 |
| 343 | American College of Computer & Inform | $18.00 | 25 | 25 | 27 | 0 | 0 | 0 | 0 |
| 345 | Webster College | $27.00 | 30 | 30 | 30 | 0 | 0 | 0 | 0 |

- Existing Fields: The following column fields exist already and just need to be incorporated into the report:
    - CPL
    - Daily Cap
    - Inventory
    - Leads To Date

- Calculated Fields: The projections are calculated by subtracting leads generated from total leads for the month. However, daily caps need to be taken into consideration, as does performance.

MC = Monthly cap           PM = Profit Margin

DC = daily cap             DR = days remaining

LG = Lead generated

Act: Actual Inventory Remaining (AIR) = IF (DR*DC < MC – LG, DR*DC, else MC – LG)

Proj: Proj Inventory Remaining (PIR) = IF (I >0.85, AIR, else AIR*I)

ROI: (CPL*Leads to Date) / Total CPM

Index = Margin Index = PM for an offer / Avg PM for all offers

2. Report by School

FIG 16

Layout of "Report by School" as generated today in the Access report:

```
                              Existing data fields                    Calculated fields
                                      ↓                                       ↓
Inventory Projections
3/24/2006               CPL    Daily Cap  Inventory  Leads To    Leads Left      Performance
                                                     Date      Act    Proj      ROI     Index
Aakers College
  353  collegeanduniversity   $24.00    30      30      1       29     2       1.82    0.08
                                                30      1       29     2    trend::      0
                                                                             need::
American Career College
  383  collegeanduniversity   $21.00    20      20     20        0     0         0      0
                                                20     20        0     0    trend::
                                                                             need::
American College of Computer & Information Syste
  343  collegeanduniversity   $18.00    25      25     27        0     0         0      0
                                                25     27        0     0    trend::
                                                                             need::
American Intercontinental University
  244  azoogle                $12.50   500   1,000  1,003        0     0         0      0
  530  media spike            $15.00   100   1,400  1,400        0     0         0      0
  252  motive                 $11.00    20   1,100    919      100    69       14.83   0.69
  599  motive                 $11.00    75     360    362        0     0         0      0
  209  Offer fusion           $10.00   100   1,760  1,770        0     0         0      0
  255  websponsor             $12.00   600   1,650  1,633       17    17       25.49   1.85
                                              7,270  7,087      117           trend::  2,465
                                                                              need::   2,348
American Intercontinental University Online
  623  motive                 $11.00   100    500     501        0     0         0      0
```

- Report by Advertiser Fields: All Existing Fields and Calculated Fields from Section 2.2.1 should be included in this report as well, using the same calculations.

- Additional Calculated Fields: Additional fields that need to be calculated are "Trend" and "Need" by school.

LG = Leads generated

DP = Days passed

TD = Total days in month

Trend: Inventory Trend = LG/DP * (TD-DP)

Needed: Project Inventory Needed (PIN) = IF( LG / DP*TD > PIR, LG / DP*TD, else 0)

3. Report by Day

FIG 17

This report is intended to give the media buyers a by-day expectation of how much total inventory can be filled the remainder of the month. The numbers will change daily based upon how much inventory was filled the previous day.

Projected Inventory By Day
November 2005

12/19/2005

| Date | Value |
|---|---|
| 12/19 | 5,505 |
| 12/20 | 3,691 |
| 12/21 | 3,035 |
| 12/22 | 2,479 |
| 12/23 | 1,954 |
| 12/24 | 1,625 |
| 12/25 | 1,026 |
| 12/26 | 884 |
| 12/27 | 728 |
| 12/28 | 634 |
| 12/29 | 567 |
| 12/30 | 484 |
| 12/31 | 484 |
| Total | 23,100 |

- Calculations:
  DC = Daily Cap
  Index = PM for an offer / Avg PM for all offers
  PIR = Proj Inventory Remaining = IF (I >0.85, AIR, else AIR*I)

For each remaining day in the month, calculate the total projected Inventory that will be filled all offers in a given campaign.

Day X Inventory Projection:

For Indexes >= 0.85: $\Sigma$ IF (PIR>DC, DC, PIR)

For Indexes < 0.85: $\Sigma$ IF (PIR>(DC*I), DC*I, PIR)

Admin System: Inventory Projections                    FIG 18

Purpose: Provides projections for the month on how much Inventory we expect to fill (based upon performance to date)

INVENTORY PROJECTION REPORTS BY SCHOOL

| View By | School |
|---|---|
| Select Campaign | freecollegescholarships.net |
| Select School | All |

UPDATE REPORT

| INVENTORY PROJECTIONS | | CPL | DAILY CAP | INVENTORY | LEADS TO DATE | LEADS LEFT ACT | LEADS LEFT PROJ | PERFORMANCE INDEX |
|---|---|---|---|---|---|---|---|---|
| ABC College | | | | | | | | |
| 383 | ACME Media | $ 21.00 | 35 | 35 | 11 | 24 | 24 | 0.88 |
| | Total | | 35 | 35 | 11 | 24 | 24 | |
| | | | | | | | | trend: 32 |
| | | | | | | | | need: 8 |
| University of State | | | | | | | | |
| 411 | Advertiser1 | $ 10.00 | 100 | 1,000 | 447 | 553 | 466 | 0.84 |
| | Total | | 100 | 1,000 | 447 | 553 | 466 | |
| | | | | | | | | trend: 1,285 |
| | | | | | | | | need: 819 |

The "Projected" & "Trend" values are calculated to help us understand where we are trending in inventory we expect to fill for the month.

The "Need" value tells us how much more inventory we could obtain and likely still fill for the month.

*can supply actual formulas if necessary*

Admin System: Auto-priority interface

Purpose: Shows the auto-priority calculation of all offers which are live. Allows manager to adjust "Business Priority Factor" – A value.

ROTATION SUMMARY USING EXPERIMENTAL ALGORITHM.

Select campaign: freecollegescholarships.net

Filter: no filter  Restrict by group: all groups

A. Business Priority Factor – can be manually adjusted

B. Payout Factor – auto calculated

C. Conversion % Factor – auto calculated

D. Inventory Factor – auto calculated

Auto-priority number →

| ID | Name | Advertiser | Group | A | CPA | B | CONV% | C | inv | D | Auto Priority | mod |
|---|---|---|---|---|---|---|---|---|---|---|---|---|
| 950 | ABC University | ACME Media | ABC | 50 | 10.00 | 9.79 | 0.07 | 108.48 | 0.95 | 4.75 | 252229.56 | update |
| 371 | ABC College | ACME Advertising | ABC | 50 | 10.00 | 15.17 | 0.19 | 280.86 | 0.02 | 1.00 | 213032.31 | update |
| 105 | My College | College Advertising | mycollege | 50 | 8.00 | 14.53 | 0.03 | 52.12 | 1.07 | 5.37 | 203336.02 | update |
| 939 | University College | ACME Media | mycollege | 100 | 9.00 | 8.85 | 0.04 | 59.81 | 0.73 | 3.66 | 193730.57 | update |

SAMPLE DATA

Fig. 19

Web Property: Customer Lead Form

FIG 21

Purpose: This an image of one of our customer web sites, demonstrating how the rotation priority affects the offer order from a user perspective.

Please Note: You are not obligated to accept free information from our sponsors, and your chances of winning our scholarship will not be affected. However, you must visit all of our free offers in order to be eligible to win our free scholarship. You are not obligated to purchase any product or service, regardless of whether you request any free information from our sponsors.

NEXT SCHOOL → you can earn your degree in just 2-3 years on average, finishing much sooner than you would at most other universities. You'll complete your degree program one 5-to-6 week course at a time, allowing you to quickly gain and apply the skills employers are looking for.

Some of the degree programs offered are:

* Business
* Technology
* Health Care
* Education
* Social Behavioral Science

Don't wait to take your career to the next level.... Sign up today to request free information about

All questions marked * are required

*First Name: John
*Last Name: Doe
*Email: test@test.com
*Home Address: 1423 First St
Address2:
*City: Atlanta
*Home Phone: 321 - 555 - 5555
*Work Phone:
Mobile Phone:
*Select Campus
Select Campus
*Program Of Interest
--Select Campus First--
*Please select your highest level of educaction
-select education level

LEAD GENERATION BUILDING, OPTIMIZATION, MANAGEMENT AND TRACKING TOOL

RELATED APPLICATIONS

This application is a continuation in part of claims benefit of the filing date of U.S. Provisional Application No. 60/823, 281, filed Aug. 22, 2006, the disclosure of which is incorporated herein by reference.

FIELD OF THE INVENTION

The instant invention relates to systems and methods for presenting offers to end users, managing inventory of the offers and maximizing profit.

BACKGROUND OF THE INVENTION

The purpose of the Internet, in terms of business, is to match consumers with products. The Internet has created an easy to access worldwide market. This market has invited many different types of merchants trying to connect with their particular consumers. However, the size and attractiveness of the market has created a very crowded cyberspace. This crowdedness has created the need for merchants to advertise or find other ways to match their product with consumers. Specialty websites, such as Amazon®, fulfill the need. Merchants will contract with these sites to either collect orders, obtain information or direct traffic to their sites. These specialty sites will have relationships with multiple merchants, and each merchant will have their own particular needs. Therefore, there is a need for an efficient system to build individualized pages for multiple merchants, manage inventory and determine the order in which those pages are displayed to the end user.

In the business of online marketing, it is necessary to efficiently create individualized web pages and to track performance of marketing campaigns with very "broken down" data to maximize business profits. There are very few tracking software applications designed for web-based business lead generation and information gathering, and the ones that are available do not meet the requirements of today's industry.

Currently, no software or system is available that allows a user to create and manage multiple offers; edit, manage, project inventory; and/or prioritize the displaying of these offers based upon several factors such as business need, income, conversion and inventory. The current packages available do not meet the needs of today's business. The main function of these packages is to handle reporting and tracking. Basically they count clicks and leads for websites. These programs have a "pixel-based" structure, meaning that one would place an invisible line of code (a pixel) on each of their web pages on ones site. Each time the page would load, the pixel would fire. This is how counts of clicks and leads occur in the current software available. There is no concept of inventory or offer priority in the available systems.

SUMMARY OF THE INVENTION

The present invention cures the deficiency of the present state of the art by allowing the user to quickly develop web pages, or offers, to meet their advertisers' individual needs; mange those offers and inventory; and prioritize the order in which the offers are displayed. Functions included in the invention allow the user to internally monitor performance of marketing campaigns; project whether they need to increase the business priority of certain advertisers to fulfill the requested lead generation; or need to contact the advertiser because of a projected ability to fulfill more lead generations than originally ordered. The invention also has the ability to automatically prioritize which advertiser's offers are to be displayed to users and in what order they will appear. The reprioritization is automatically determined by several factors. These factors include automatically calculated fields based upon the number of orders outstanding from an advertiser, the revenue generated from each conversion and the conversion rate of each offer. There can also be a manual factor inserted based upon the business priority as determined by the user. The current invention allows the user to effectively and efficiently run a business where the user is required to set up offers for individual advertisers, show those offers to possible customers and maintain an effective balance of priority based upon business concerns, revenue, inventory of offer and conversion rates.

While this description is geared to a web-based business, the adaptation can be made to traditional brick and mortar, financial institutions, insurance and any other business where one would have multiple products competing for the same consumers is contemplated.

BRIEF DESCRIPTION OF THE DRAWINGS

FIGS. 1-21 are schematics of the various aspects of the instant invention;

FIGS. 1 and 2 detail an overview of the build offer process according to the present invention;

FIGS. 3-10 show an embodiment of the offer build process in the form of a graphical user interface as employed by the user of the invention;

FIG. 11 shows a flow diagram of an embodiment of the invention in line with a incentive based campaign;

FIG. 12 shows a flow diagram of an embodiment of the invention in line with a non-incentive based campaign;

FIG. 13 shows a flow diagram of an embodiment of the invention in line with a incentive based campaign with offers from a variety of sources;

FIGS. 14*a* and 14*b* show screen shots for a graphical user interface for entering and managing of inventory by a user according to an embodiment of the inventory management system of the instant invention;

FIGS. 15-18 show annotated screen shots of reports and formulas used by an embodiment of the inventory projection system of the invention;

FIG. 19 shows screen shots for a graphical user interface for entering and managing of information by a user according to an embodiment of auto-priority system of the instant invention;

FIG. 20 shows an annotated screen shot of a report produced by an embodiment of the auto-priority system of the instant invention with information of the offer display order; and FIG. 21 shows a sample of the end user interface according to an embodiment of the instant invention.

DETAILED DESCRIPTION

When describing this invention it is necessary to become acquainted with terminology employed in the description and the figures. These definitions are used to describe the example and are in no way meant to limit the scope of the invention.

Advertiser is used to describe an entity that is a client of the user. This includes schools and brokers who represent schools.

School is a subclass of advertiser. In the example shown in this disclosure, a school is a direct client of the user, without a broker.

Offer is used to describe a lead generation form that is built for individual advertisers. The offer may have fields required by that advertiser in order to obtain information from outside users. It can also just display a product. While the offer is described in the example below as a lead generation form, it can be used in any environment where unique interfaces must be created and information obtained from the end users.

Inventory is used to describe the number of outstanding orders for an offer.

Offer Build and Management Administrative System

The first aspect of the invention is the way in which an offer is developed for each advertiser and how the offers are managed. Although each offer is unique, they share many common elements. It provides a business advantage to build these offers and set them "live" as quickly as possible. The need to fulfill these two requirements, in addition to the ability to create a large volume of individualized offers, requires a streamlined process and template tool for generating new offers.

This facet of the invention comprises of a process and administrative system interface to quickly build and update offers. Without this build template inside the administrative system, one would have to write source code for each new offer built. Instead, all requirements common to the majority of offers are entered into the global template, and the offer is generated by the system. Thus a change in the global template will alter all of the offers built with the global template. By way of an example, the system will be described in an application where lead generation for multiple different educational institutions is the product. The steps of creating an offer are shown in FIGS. 1-10.

Figure 1:
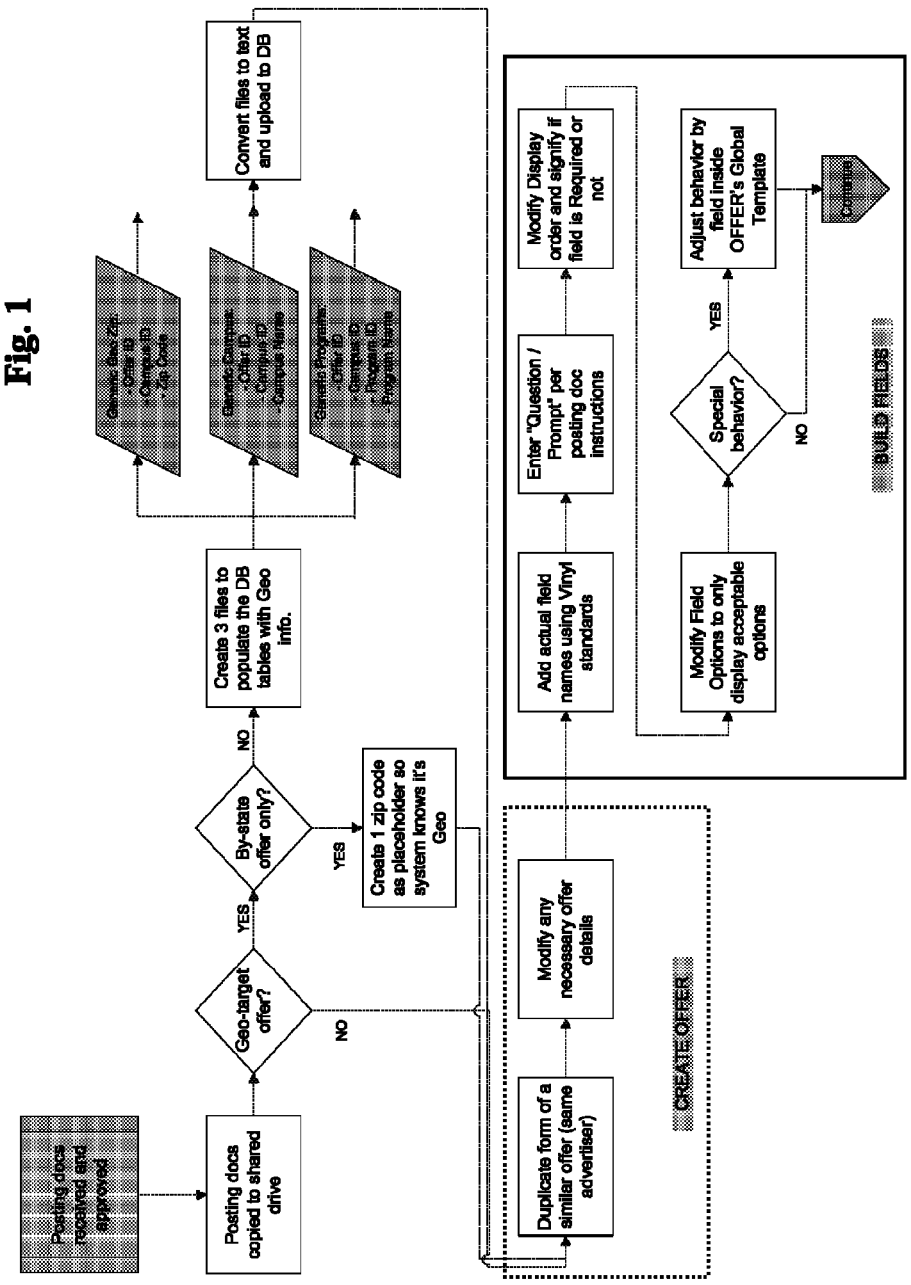
Figure 2:
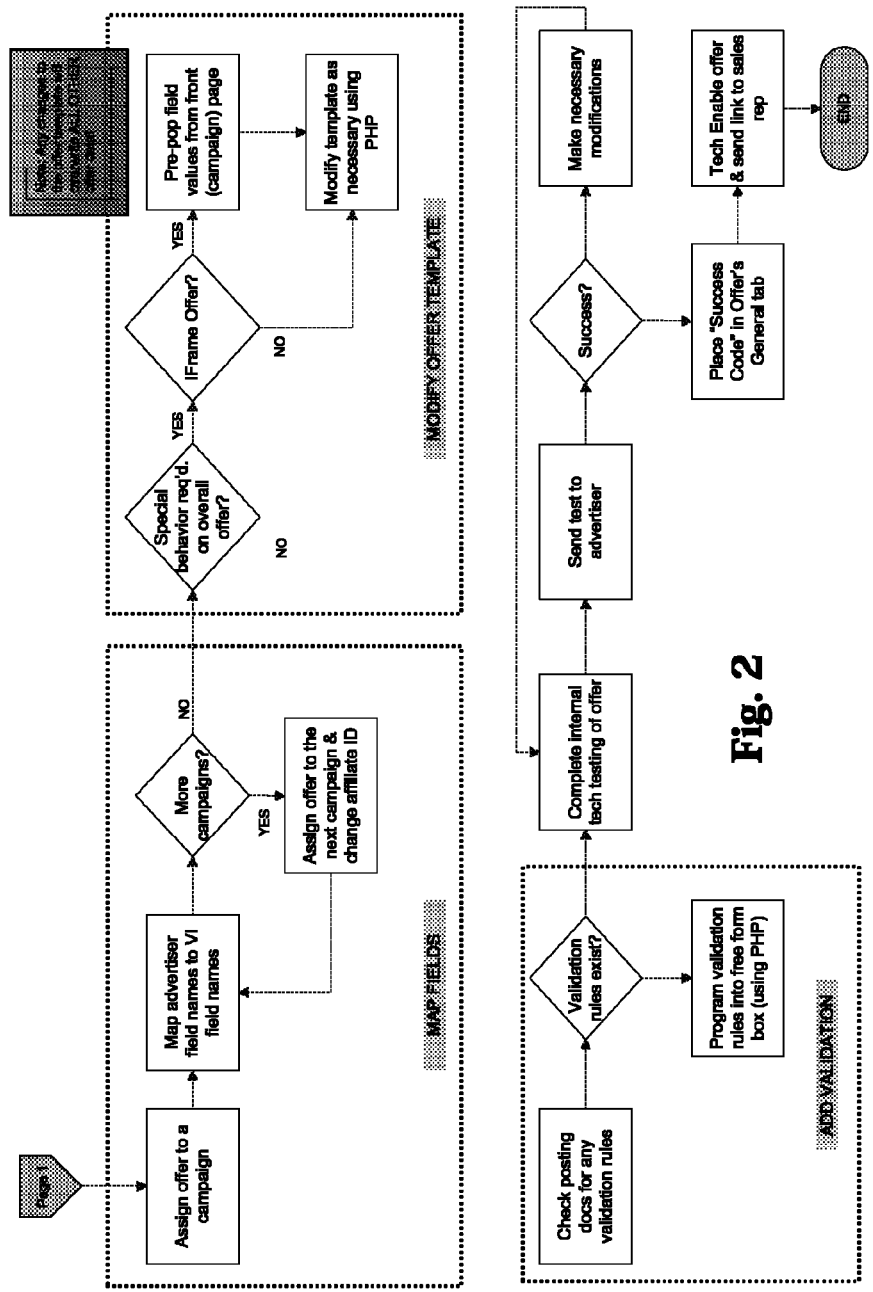

FIGS. 1 and 2 disclose a flow chart of how the offer is built. First, the information for the offer is obtained by the user. The invention then allows for the advertiser to place geographical constraints on some or all of the inventory. In the example shown, this could be required for programs that are not offered online, such as traditional brick and mortar institutions. This will prevent the situation where the offer is shown to a prospective student who lives across the country and is less likely to take advantage of the offer. In the example, the database tables contain the geographic data for the offer. An offer can be geo-targeted at the campus level or program level (i.e. certain programs within a school are only available in certain geographic locations). This also allows the advertiser another way to target a specific market. If there is a geographic constraint, the user will account for that and move forward in the offer build process.

The user can either create an offer from scratch, inserting all of the data and fields from the global template that are required, or if reasonable, duplicate an offer that has similar fields and modify the offer details. This duplicate function also allows the user to quickly process the offer if there is more than one offer from a single advertiser. Again, all the user needs to do is modify the fields and/or the offer details, shown by example in FIG. 3. Also, if there are multiple offers from a single advertiser, the user can assign a specific identification (ID) to that advertiser which will enable the user to pull up all of the offers associated with that advertiser.

After the details of the offer are entered, the user will add the required fields to the offer. The fields are determined by what information the advertiser requires from the end user to be considered a successful conversion. The user can also determine what fields are required from the end user in order for the end user to successfully submit the information. If the end user did not enter the proper information in the required fields, the user would get a failure notice and be asked to fill in the fields. The user can also enable the offer to show the end user the acceptable answers, such as a drop down menu. To make offer build process work efficiently as possible, common fields within the offers are identified (i.e. "First Name", "Last Name", "Address", etc.) and are incorporated into a global template. The user is able to add fields to the global template as needed.

If the advertiser requires information that is outside the fields within the global template, the invention allows the user to adjust the behavior of the offer and tailor the offer to meet the advertiser's specific needs.

FIG. 2 shows the continuation of the process from FIG. 1. After building the fields, the user will then map the fields to the advertiser's-specific field names. The invention also allows the user to have many different types of campaigns. With the current example, the user may assign the offer to campaigns associated with free scholarships, obtaining a degree, an incentivized site, or any combination thereof.

At times, a special behavior is required for the offer. In that case, the user can either use Iframes or modify the offer using an appropriate editor. Iframes are used when the advertiser "hosts" the offer code and the user merely "frames" it inside a campaign web site. When modifying the offer template, it may or may not overwrite all other offer data. However, as anyone can see, if the actions/fields required become very common, they can be added to the template.

Sometimes validation rules are required. In that case, the user is able to insert the validation rules into the offer.

There are times when the advertiser wants their specific images to be displayed with the offer. The user is able to associate these images with the specific offer.

After building the offer, testing is performed. Dummy information is used, and the dummy information is then transferred to the advertiser. The advertiser then checks to see if the information and the format of the data meet their requirements. If the advertiser is satisfied, the offer is made live, if not, the necessary modifications are performed.

FIGS. 3-10 show slides of the user interface of the offer build system.

FIG. 3 shows some possible information that can be inserted into an offer. It also shows that the user can create different offers for a single advertiser. In the case of multiple offers from a single advertiser, there is an ID associated with that advertiser.

FIG. 4 shows that the user will add or remove fields to the offer as required by the advertiser's specification. There is also a way for the user to make a field required and determine the order in which the fields appear on the offer. Every offer can have an ID associated with it so that it can be identified within the system, but several offers may originate from the same advertiser, having the same advertiser ID. It is also contemplated that there may be two or more different IDs. As an example of two IDs, one could indicate the offer, and the other would be specific to the offer's advertiser (school or broker).

FIG. 5 shows how the user can create drop down menus for the fields in the offers. The drop down menus requires that the end user select pre-specified answer. This limits the possibility of answers and better helps to classify the end user.

FIG. 6 shows that if the advertiser's needs are not met by the items supplied in the template, the user is still able to modify the offer field template by using an acceptable editor and code language. The template is not limited to fields. It can contain common code used by all offers. Most common offer features can also be disabled through this interface with the use of simple programming commands written in Smarty, a PHP template language. FIG. 7 shows that if the advertiser wants to accept the information directly into their database, the user can obtain the advertiser's field names and map those names to the user's field names. This allows the user to directly push the information collected the advertiser's database without much delay and in the format they desire. The information supplied to the advertiser can either be instantaneous, hourly, weekly or any other time frame the advertiser requests.

Figure 8:
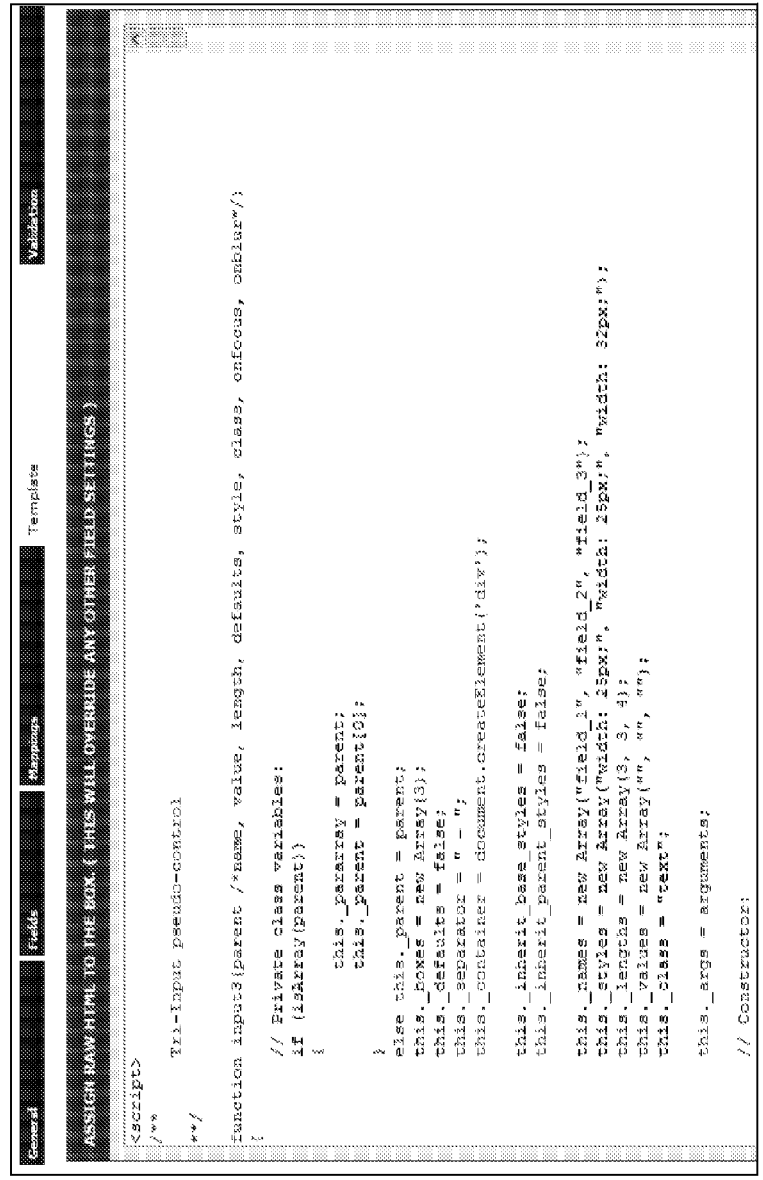

FIG. 8 shows that the user is able to incorporate the use of Iframes/frames if they are required. The user will use the smarty function to pre-pop field values from the front offer of the user's site.

Figure 9:
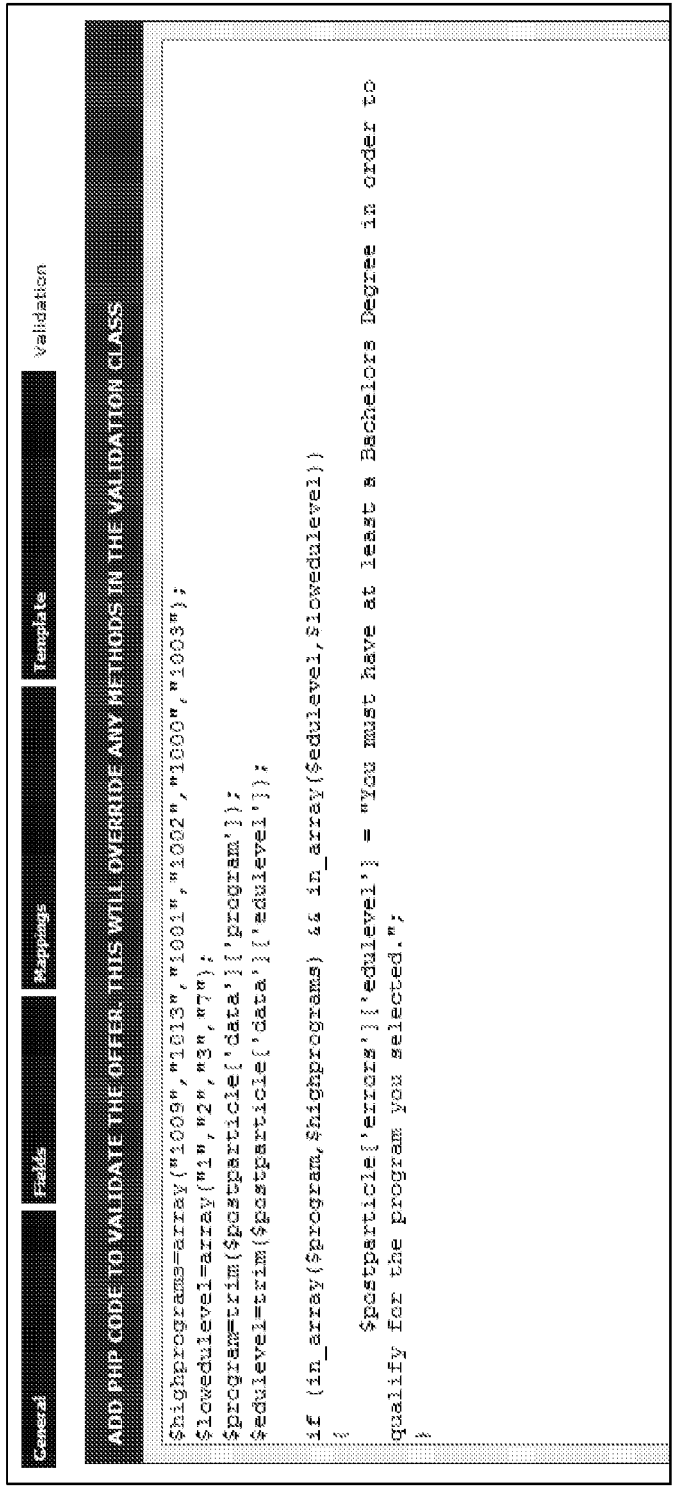

FIG. 9 shows that if the advertiser's needs do not allow certain field combinations in the offer, validation rules can be associated with that advertiser's offer. This will prevent the submission of a lead unless the end user's selections pass validation.

Once the offer is built or made live, the user can use the system to edit the offer at any time. The system may have secured login system so that users can access and edit the information anywhere they are able to access the Internet.

Inventory Management & Projections

Once the offers are built and saved, the user must have a way to manage all of the offers and inventory. The user could have several campaigns running at the same time, with hundreds of offers associated with each campaign. Offers can be associated with one or more campaigns. The user may also have to re-establish inventory and pricing for each offer that will be running during certain time period. It is necessary to have a system and a user interface for managing the offers and their inventory. Additionally, to maintain client relationships, maximize profit and ensure future inventory, it is important that the user utilize as much of the allocated inventory as possible during an allotted time period. In order for the user to have continuous insight into whether an offer will utilize its inventory or not, the system has internal projection calculations that provide the user with a metric to determine the likelihood an offer's inventory will be utilized or not within the allotted time period.

Once an offer has been built, the user can go into the inventory system to add inventory for that offer. In the example disclosed, inventory is set on a monthly basis, and the process has to be repeated each month. However, the user can determine any time period in which to use as their basis. The user will enter the critical information manually, such as the price point, daily and/or monthly caps, and which of the user's campaigns the offer is associated.

The administrative system will then electronically update any changes in inventory indicating what has been used, needs to be used, and income generated from the used inventory, once an action has taken place. Additionally, the interface provides for a "one-click" method for disabling an offer instantly, if for some reason there is a need to stop displaying a specific offer. If a certain offer receives certain number of rejections (when the information is submitted to the advertisers and a failure occurs), then that offer will become automatically disabled until the issue has been resolved. As per the example, the instance of 10 failures in a row is the triggering event. The user could very easily define other parameters for the system to automatically disable the offer. The parameters can be based upon certain failures in a row and/or a percentage rate. The parameter is easily determined by the user.

The system is also able to provide a cap for the amount of inventory used within a certain geographic location. Thus when a predetermined number of offers are converted by end users of a certain geographic location, the offer will be excluded from being displayed to end users within that geographic location. However the offer will still be presented to others outside that geographic location. Also, there may be instances where there is a national association or a franchise chain, if more than a predetermined number of offers are associated with a branch are being used, the offer will be turned off for that branch, yet still be offered for end users not be associated with that branch. In line with the example, there are yet other times where there is a national type university that has branch locations or specific areas where they target end users. The system will place caps on the amount of people meeting certain criteria, prevent the offer from being displayed to other end users meeting that criteria for a period of time, but yet allow the same offer to be presented to end users who do not meet that criteria. There can also be a cap on number of conversions originating from a specific third party.

Figure 11:
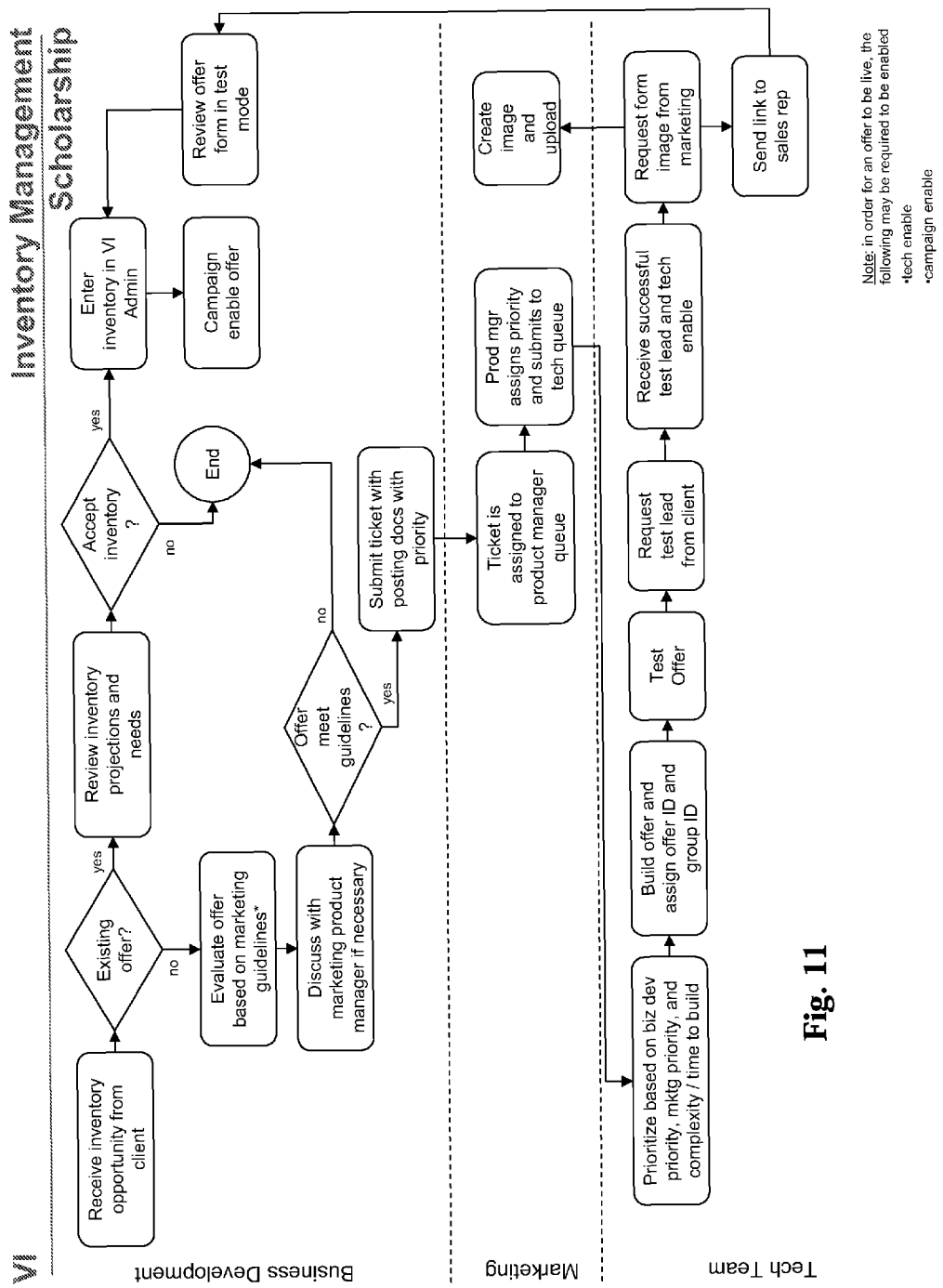
Figure 12:
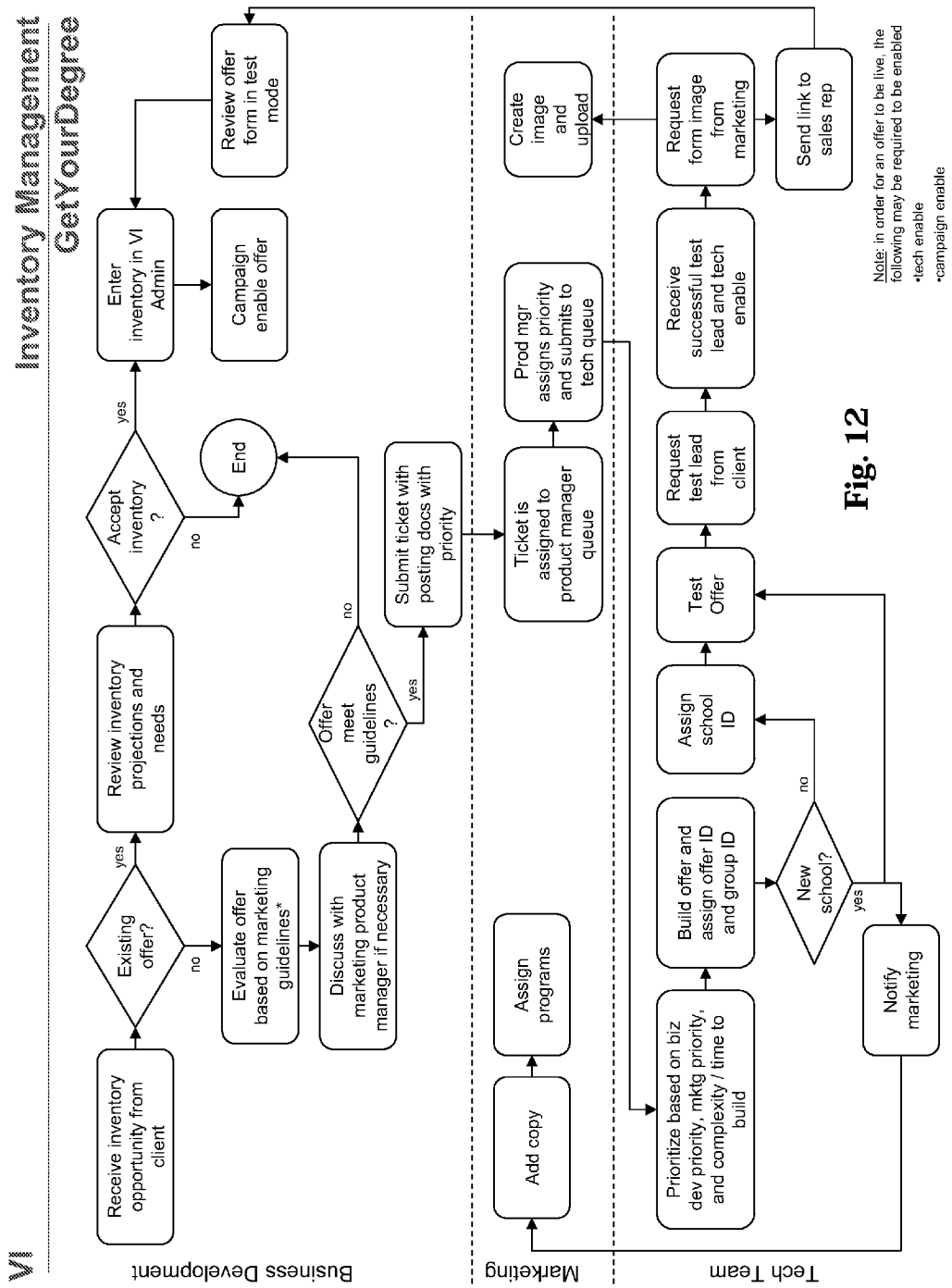
Figure 13:
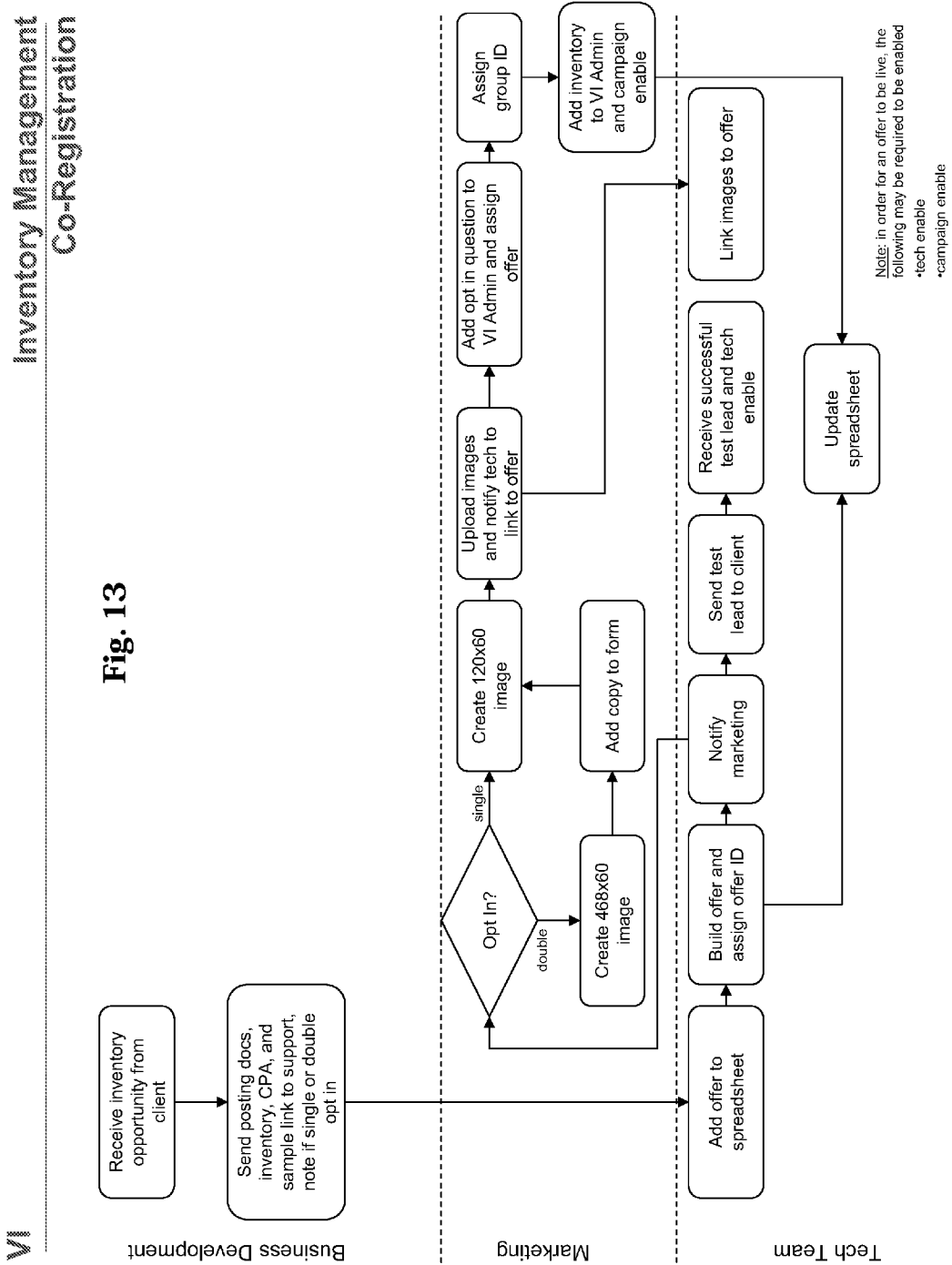

As per the example disclosed in FIGS. 11-13, three campaigns are shown. In FIG. 11, the process associated with a campaign designed to match prospective students with scholarships is disclosed.

First, the user will receive an allotment of inventory from an advertiser. If the request comes for a new offer, the user would determine if it is appropriate to accept the request. The user may consider marketing factors and the users own guidelines before accepting the request. The user would then use the offer build system discussed above to create the offer, insert the inventory (same as with an existing offer), and make the offer live. The user is not restricted to a first come, first build process. The user, using their judgment based upon factors such as business development, marketing priorities, and complexity/time to build the offer, can determine what offers have priority, and what offers are built first.

If the inventory request is for an existing offer, the user will then review inventory projections and needs (discussed below) to determine whether or not to accept that offer. If the user accepts, the user will then enter the inventory into the inventory management system. Once the inventory management system is updated, all functions that employ inventory as a factor will be automatically updated. Therefore, the entire system will work based upon the new inventory allotted for that specific offer.

FIG. 12 shows a Get Your Degree campaign. In this example, the campaign is designed to match prospective students with schools. This campaign varies from the scholarship campaign in that it does not offer the end user an incentive (i.e. a chance to win a scholarship) for viewing the offers. As mentioned above, the invention allows the user to associate many different offers with the same advertiser by assigning an ID with that advertiser, such as a number.

FIG. 13 shows a third campaign called co-registration. This site is an example of another incentivized site that contains offers from a variety of sources. The end user has to successfully view and/or fill out a predetermined number of offers before being eligible for the incentive.

It is clear that any campaign can be created using the invention that places customers in contact with potential clients. As another example, the user could very easily use the invention in the financial and insurance business. The user could set up offers for different financial instruments from multiple financial carriers. These offers could be accessed by the financial or insurance institutions' agents, independent agents (who get commissions for selling products) or the end user themselves. The user could also be an independent brokerage and set up the system to maximize profits (commissions) by using the invention to create and manage the offers, as well as determine the priority in which their employees access the offers to sale to the public.

Figure 14:
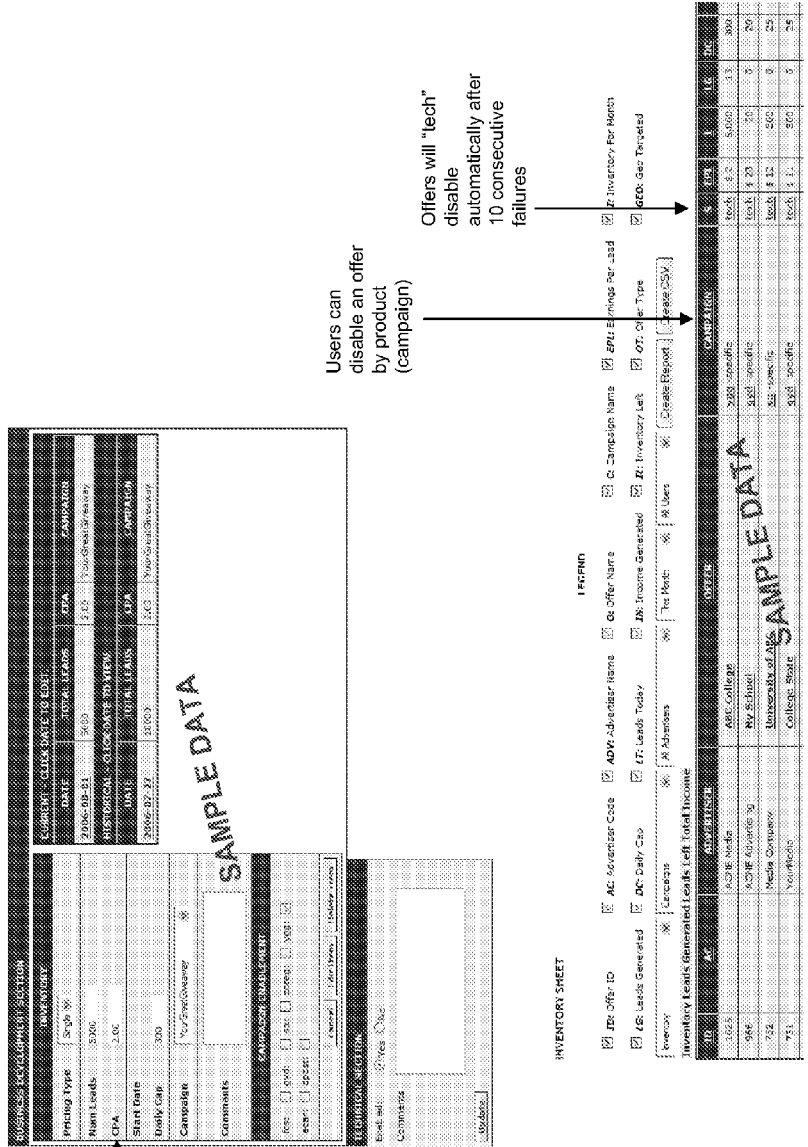

FIG. 14 shows a sample user interface for entering and managing an offer's inventory. In this example, the inventory management system allows the user to input a month's worth of inventory, shown as leads. The inventory management system also allows for the user to indicate the start date and the campaign the offer is associated with. The system also allows the user to define a daily cap for the offer. Sometimes it is beneficial for the advertiser to space out the leads they receive so they can send a steady flow of leads directly to the schools and schools can better manage contacting perspective students. The user is also able to insert comments about the offer for future reference. The user interface will also display the history of the offer for which the user is updating the inventory.

The user may also provide a secure interface so that the advertisers can update their inventory on their own.

FIG. 14 also shows an inventory sheet displaying the current inventory for all active offers. The user is able to create a detailed report that is filtered for the specific information by present or past months, what advertisers, which user is assigned to the offer, and what campaign is associated with the offer. The sheet is user friendly in that it enables the user to determine what categories are shown in the sheet. It also allows the user to arrange the sheet by the values in each of the categories. Categories can include, but are not limit to: offer ID; advertiser code; advertiser name; offer name; campaign name; earnings per lead; inventory for the month; leads generated; daily cap; leads today; income generated; inventory left; offer type; and geographically limited offers. The user is able to determine what categories are relevant to their specific needs and produce a sheet accordingly. The user is free to create new categories to match their particular needs.

It is necessary to have a good understanding into how inventory is performing during the allotted time period, and project the likelihood of filling inventory commitments made to advertisers. Therefore, a projection must be made to determine if the entire inventory is going to be used. This projection is not a straight-line calculation because offer priority can change so frequently.

The user can break down the trends by producing reports based upon certain criteria. FIGS. 15-17, show reports based on advertiser, school and day. These figures use the example of a lead generation system for matching prospective students with schools to demonstrate how the invention works. FIG. 15 shows a report based upon brokers, who can represent individual schools (called advertisers in the figure). The figure shows that there are several fields that are present in existing data fields and are incorporated into the report. These fields are Cost Per Lead (CPL), Daily Cap (DC), Inventory, and Leads to Date. The report then uses these fields to calculate leads left (remaining inventory) and performance. The leads left are broken down to Actual Inventory Remaining (AIR) and Projected Inventory Remaining (PIR).

$$AIR=IF\ (DR*DC<MC-LG,\ DR*DC,\ else\ MC-LG)$$

$$PIR=IF\ (I>0.85,\ AIR,\ else\ AIR*I)$$

Wherein

| | |
|---|---|
| I = Index | MC = Monthly cap |
| PM = Profit Margin | DC = Daily Cap |
| DR = Days Remaining | LG = Lead Generated |

CPM=Cost Per Impression (Impressions=the number of times page is viewed)

The performance factors are Return on Investment (ROI) and Margin Index (Index).

$$ROI=(CPL*Leads\ To\ Date)/Total\ CPM$$

$$Index=PM\ for\ an\ offer/Average\ PM\ for\ all\ offers$$

FIG. 16 shows a report by school. Again, the same fields are used. However, two additional projection fields are shown. These fields are Trend and Need. Trend represents inventory trend, how much inventory is expected to be used by the end of the allotted time period. Here that time period is a month. Need represents projected inventory needed, the amount of inventory that could be used over the remaining inventory for the rest of the month. This allows the user to identify those offers where they either need to approach the advertisers and ask for more inventory or adjust the offer to make it perform better. While Trend and Need are not shown in FIG. 15, it is possible to have those calculations on that report or any report.

The Trend and Need are calculated using the following:

$$Trend=LG/DP*(TD-DP)$$

$$Need\ (PIN)=IF\ (LG/DP*TD>PIR,\ LG/DP*TD,\ else\ 0)$$

Wherein:

| | |
|---|---|
| LG = Leads Generated | DP = Days Passed |
| TD = Total Days in Month | PIR = Projected Inventory Remaining |

FIG. 17 shows a report by day. The user is able to use this report to show how much inventory is projected to be remaining for each day left in the month. This report is very useful and is updated continuously or at a predetermined interval, such as a day. The user may choose to employ publishers, such as a search engine, to help attract end users. In such an instance, the publishers may get a certain amount for each lead that comes from their directing traffic to the site or on a per visit basis. As in this example, the user grants a publishers' media buyers access to the daily reports so that they can determine how much traffic they want to direct to the site.

The inventory projection is determined in the following way:

Inventory Projection=

For Offers with Indexes>=0.85:Σ IF (PIR>DC, DC, else PIR)

For Offers with Indexes<0.85:Σ IF (PIR>(DC*I), DC*I, else PIR)

FIG. 18 shows a user interface for compiling the reports and viewing the Trend and Need values.

Auto-Priority System

Figure 20:
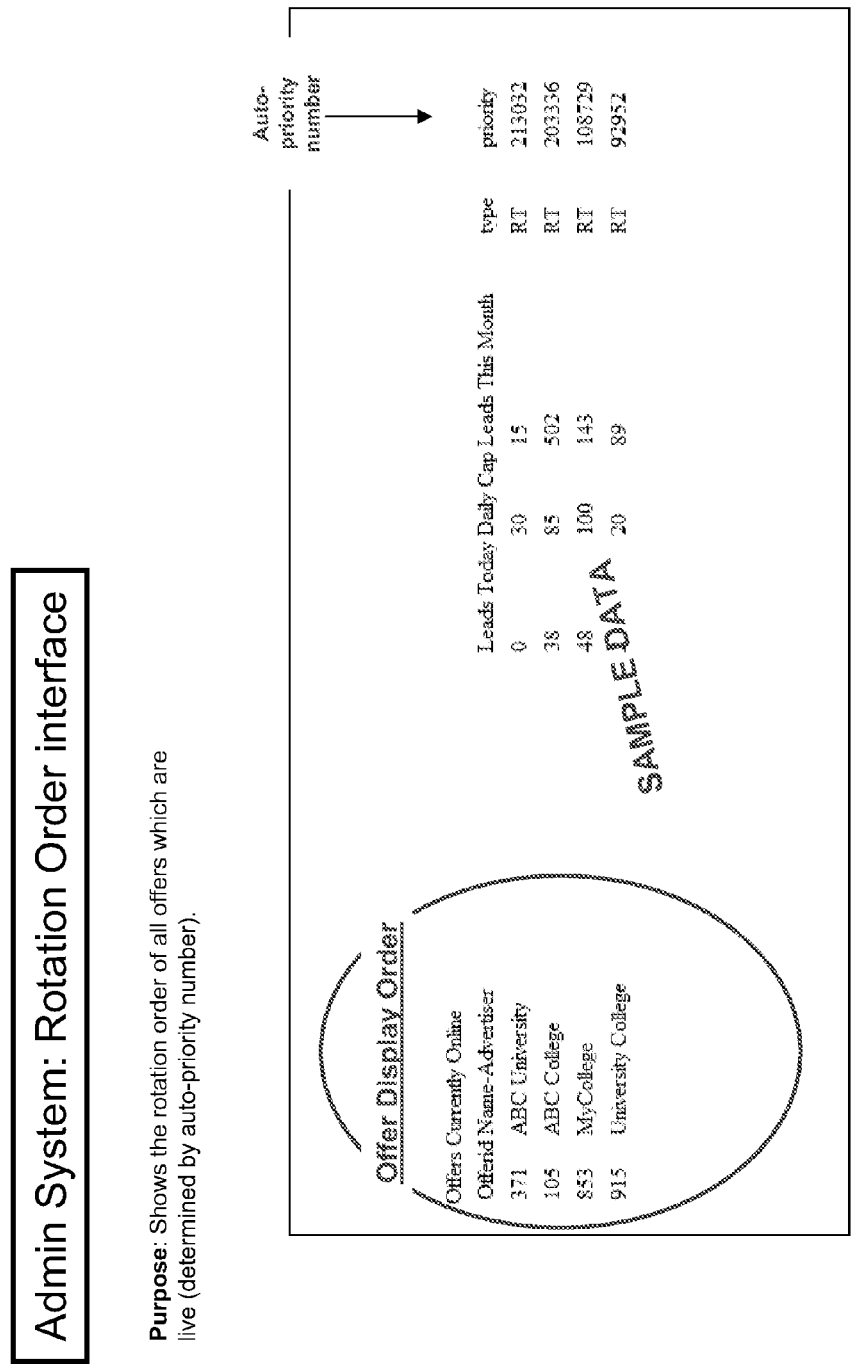

FIGS. 19-21 are from an example of the system used in an online environment. In this example, end users come to the landing page of a campaign web site and input some initial data, such as their name and zip code, and submit that information. The system will then display the offers one at a time as not to overwhelm the end user and to point them in a desired direction. However, the priority system can be used to display multiple offers within a single page. The priority system can be configured and used to determine what offers are shown and in what order.

The system may also take into account the end users location for use with geographical limited offers. The system may also retain the information that the end user has submitted from any point within the site and import that information into the appropriate fields within the same or other campaigns. This is done in an effort to help the end user complete the offers as quickly as possible.

Analysis has shown that end users, on average, will complete two to three offers per visit to a campaign web site. Therefore, it is important to show the "best" offers first in the rotation. The "best" offer to the user is one that maximizes earnings, and that can be influenced by several factors.

The auto-priority system determines in what order the offers will be displayed to the end user. There are many ways mechanically to do this. One way of presenting the offers to the end user is to have a predetermined order of pages within the site. The pages content will vary based upon the auto priority system. The end user will access the landing page (the first page on the site) and then input some basic information, including geographical information. The system will determine what offers are to be moved to what pages within the site (page 1, 2, 3 and so on) until all of the active offers for that end user are placed on a page. Therefore, the end users will then move along the set path of pages, but the content of those pages, the offers, will be determined by the auto-priority system. The number of pages shown will be limited to the number of offers available to that end user. This is the way in which the offers are displayed in the example.

After the end user has been presented the last offer, the user will can be sent to the next page that contains exit information (such as a "thank you come again" or "we will be in touch"). This exit page can be created like an offer in the auto-priority system, but will always have the lowest priority. Alternatively, it can be a permanent page to which the user is directed.

In order to maximize profit and maintain customer/advertiser satisfaction, a system of prioritizing what order the offers are displayed to an end users is desired. The invention has a system that can be employed. This system, based upon several factors, automatically determines the appropriate priority factor each offer. Once the priority factor is determined, the order in which the offers are displayed is arranged accordingly. The user is able to determine how often the auto-priority system will run. The user may find that a continuous calculation is appropriate or set it to some other frequency. One available option is to employ a "decision-engine" environment, where the auto-priority system runs in real-time and will create an order that is specific to that end user. In a "decision-engine" environment, the user will determine what information is required to determine that end user's order of offers. The order can be determined after submitting information to the landing page, or change in response to answers to the offers presented. The system is flexible and allows the user to determine what works best for their given situation. The user is then able to manage vast number of orders and maximize profit.

In determining the auto-priority factor, the system can include four factors from each offer: Business Priority Factor; Payout Factor; Conversion Element; and Inventory Element. However, the system can employ any number of factors that the user deems appropriate. The business priority can be entered manually or created automatically. This allows the user to influence the priority based upon their business needs. The user may want to establish a good working relationship with a new advertiser, or they may have received complaints about the performance of a certain offer. These considerations are sometimes hard to quantify, but that does not make them any less important to a business. The business priority factor enables the user to account for these concerns without totally abandoning a priority scheme that helps maximize profit. It also helps the user take some effect out of the poor decisions of employees.

The payout factor is based upon how much is paid for the successful conversion of an offer. The payout factor can be based upon the relative payout of that offer when compared to others. Alternatively, the payout factor can be determined any other way that a user will want to measure the income from an offer, relative to other offers or not.

The third factor is the conversion element. This factor allows the user to account for end user choice when viewing the offer. It is sometimes the case where there will be a large payout for a conversion for a product that no one wants. Given the effort to get end users to one's web site or locale and the limited amount of time the end user spends looking at offers, it is important to consider what offers they are likely to accept. This factor combined with the payout factor enables the auto-priority system to make a continuous cost benefit analysis for each offer. This number may be based upon how many times an offer is shown verses successful conversions.

Given end users' behavior, the conversion element must account for the fact that end users abandon sites at a higher rate as they mover deeper into the site. This is the natural behavior of website navigation. End users abandon as they move farther through pages. Therefore, page one gets the most impressions, then page two, and so on. The result is that page one is the most valuable space, then page two, etc. Therefore, the conversion element is best determined by not using a straight line approach. Offers, located on page one, that receive an impression are to be held to higher standard in terms of the conversion rate. The conversion element for offers higher in the order (page one, two etc.) that do not convert will more severely affected in the auto-priority system than if they were much lower in the order (i.e. seventh or eighth offer shown). Conversely, offers that convert well lower in the order deserve to be credited. In essence, the system will determine a weight factor to indicate how, in light of end user behavior, that page fares due to its position and not the offers on it.

Another consideration is the amount of inventory an offer has. As with any business, one would like to move excess inventory. Also, one cannot sale what one does not have. In the present example, another consideration is the satisfaction of the advertisers. When the advertisers supply the user with an inventory for the offer, they expect to have that inventory used. The inventory element in the auto-priority system allows the system to account for an offer's remaining inventory when determining the offer's priority. The user can also have the inventory element, as well as any other factor, capped to prevent over weighting the auto-priority factor in terms of inventory.

The auto-priority system will take all of the factors that the user has deemed appropriate and produce the auto-priority factor. Once the auto-priority factor is created, it will then determine the order in which the offers are to be displayed to an end user.

A sample algorithm for priority is as follows:

Priority=$a*b*c*d$

Wherein:

| | |
|---|---|
| a = Business Priority | b = Payout Factor |
| c = Conversion Element | d = Inventory Element |

The system can also take into account offers with geographic limitations. When the end user inputs their location via zip code or address, the system will then exclude those offers with a higher priority number if the offers are restricted to a geographic location different from that of the end user. The system can also allow the user to increase the priority of the geographical limited offers if an end user were to indicate that they were present within the offer's geographical location.

Another way of presenting offers with geographic limitations is to have the geographic information compared to the database of geographic offers. If there is a positive match, those offers will be included into the offers shown to the end user. The user is free to determine where in the order they want the geographic orders displayed (i.e. always first or always last).

A decision engine can also be used to direct specific end users to specific offers, be used to add another priority factor to the priority determination, or reprioritize the offers already set in the previously decided display order. As mentioned above, end users will enter demographic information. That information can include race, religion, income, marital status, gender, nationality and any other information about the end user that the user will deem necessary. Other embodiments will have a Demographic decision engine that can access information and classify end users by their demographic information. Thus when a new end user enters information about themselves, the demographic decision engine will look to that information and see if others with certain like characteristics made successful conversions. The demographic decision engine can either expressly override the priority and direct the end user to the offers that the decision engine determines most likely to convert, or affect the priority certain offers. The demographic decision engine can either move an offer up in the display order or move an offer down in response to the classification of the instant end user in view of the behavior of past end users who the demographic decision engine determines to be relevant.

In addition to a demographic decision engine, the invention can also have a selection decision engine. The selection decision engine will contain a feedback loop and analyze the selections/input made by the end user immediately after the selections are made. The selection decision engine will then, like the demographics decision engine, access stored information and analyze the instant end user to see if the end user may fall into a classification or mirror the behavior of past end users. After analyzing the instant end users in view of stored information, the selection decision engine will decide whether or not to vary the order of offers to be presented to the instant end user. Like the demographic decision engine, the selection decision engine can also be used to direct specific end users to specific offers, be used to add another priority factor to the priority determination, or reprioritize the offers already set in the previously decided display order.

It is to be understood that in embodiments where if any of the decisions engines are employed together in the same embodiment, the decisions engines can work together, acquire input from one another and/or have overlapping functions. The end result of the communication is that the end user will be analyzed in view of past end users to present what is believed to be the most effective offers to obtain a conversion, while maximizing profit. In other embodiments, only the first set numbers of offers will be based upon the priority and/or the decision engine(s). It has been found that there is a diminishing return on the conversions as the end users progress through the offers. Many end users will tire of being presented offers and chose not to convert any more offers. However other end users will convert a majority of the offers presented to them. Therefore, when that point of diminishing return is determined, such as six offers, it is more prudent for the system to present the offers with the highest pay out factor. In order to take advantage of the end users that tend to convert, these specific end users need to be identified. One way to identify these specific end users is to classify them by how many offers they have been presented. If the end user is more likely to convert most offers presented to them, it is best to maximize profit by presenting them the offers with the highest pay out factors. The point the end user reaches when the system will switch to presenting the offers with the highest pay out factor is called the set point. It is assumed that after the set point is reached by an end user, they are the type of end user that will convert all or most of the offers presented to them, if not the next couple. Thus, the system will present the offers with the highest payout factor to the end user after the set point is reached. The set point can be static or dynamic. A dynamic set point can be determined by the priority and/or the decision engine(s).

FIG. 19 shows an example of a user interface for the auto-priority system. This user interface allows the user to manually adjust the business priority factor to an appropriate level. While the interface shows that the user will input a number as a factor, it is also contemplated that interface will have a drop down menu for the user to determine the priority. The drop down menu can have options like low, medium and high, very high, etc. Each of these values would have a standard factor associated therewith. This would allow the user to maintain a certain level of continuity between priorities and not skew the auto-priority function.

FIG. 20 shows the rotation order interface. This allows the user to see in what order the offers are being displayed. The user can also create reports based upon geographic locations to see the offer priority in a selected geographic location.

FIG. 21 shows an example of how the end user will view the offers after the landing page, which may or may not require information submission. The figure shows an example of what the offer building system creates. The details of the specific offer are shown on the side. The fields that the advertiser requires are shown in the offer and are to be filled out by the end user. The end user can then fill out the fields and press "submit". They are then taken to the next page. The offer associated with that page, and the pages after that, is determined by the auto-priority system. The user can also decide not to fill out the fields for a particular offer. They will be directed to the next offer as determined by the auto-priority system.

Another way of displaying the offers is to have the offers associated with a set page. Then having the auto-priority system determine the order in which the pages are pushed to the end user.

It is also possible to have the end user directed to another campaign once the end user is finished with all the offers within a previous campaign. Given that there can be any number of campaigns; the priority system can be geared to determine what campaign the end user will be directed after completing a previous campaign. One way to do this is to have other campaigns entered into the auto-priority system, but have priority numbers that are less than of all offers within the campaign. However, the campaigns arrangement (at the bottom of the auto-priority system) can vary among the campaigns, with numbers lower than that of all the offers associated with the first campaign.

However, a user may place other campaigns within the auto-priority system to compete with offers. This will allow the user to maximize profit if a certain campaign will present more profit than the remaining offers for associated with that original campaign.

Traffic Optimizer

In other embodiments, a traffic optimizer can be employed. A traffic optimizer will manage the traffic of end users being directed to the site from referral sites. This is also known as throttling. This may be used because it may be found by a decision engine or other means (e.g. statistical analysis) that certain referral sites present a better end user for the specific offers being presented at the top of the priority or before the set point. It may determined that the time in which the users are presented to offers may vary their desirability as end users for certain offers. Given that the offer priorities can change, the throttling need of individual sites may also change. The decision to throttle can be made by a traffic decision engine or can be set by the user. The traffic decision engine, like all the other engines, can employ the all other decision engines, obtain inputs from the all other decision engines, and access all parts of the system.

Numerous modifications and alternative arrangements may be devised by those skilled in the art without departing from the spirit and scope of the present invention, and the present invention is intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. An offer prioritization system comprising:
   a processor;
   an offer module that contains one or more offers for display to an end user;
   an end user receiving module;
   an end user input module that allows the end user to input data;
   an information module that contains data associated with the one or more offers;
   an auto-priority module that ranks the one or more offers based upon one or more auto-priority factors; wherein the one or more auto-priority factors is a business priority factor, a payout factor, a conversion element, an inventory element or any combination thereof;
   a decision module that determines displayed offers; wherein the displayed offers comprise the one or more offers that are to be displayed to the end user; the decision module also places the displayed offers in a display order; wherein the display order comprises the order in which the end user is to view the displayed offers; wherein the decision module uses information from the information module, the end user input module, the rank from the auto-priority module, a decision engine or combinations thereof, to determine the displayed offers and the display order;
   wherein the conversion element is based upon the previous number of times an offer has been displayed and the number of successful conversions of that offer, and wherein the conversion element takes into account that offer's positions in one or more previous displays orders; and
   a display module, wherein the display module will present the displayed offers in the display order as decided by the decision module;
   wherein the decision module has access to the processor.

2. An offer prioritization system according to claim 1, wherein the input data is gender, name, date of birth, address, zip code, health, telephone number, areas of interest, hobbies, income, risk adverseness, property, information about lineage, progeny, or any combination thereof.

3. An offer prioritization system according to claim 1, wherein the decision engine comprises of a demographic decision engine, a selection decision engine or a combination thereof.

4. An offer prioritization system according to claim 3, wherein the demographic decision engine is capable of comparing the input data of the end user to one or more previous end users' input data and producing a demographic result for the end user based upon the comparison; and the selection decision engine is capable of comparing selections of the end user to one or more previous end user's selections and producing a selection result.

5. An offer prioritization system according to claim 3, wherein the decision engine is capable of making the comparison in real-time, according to a predetermined schedule, or upon the happening of an event.

6. An offer prioritization system according to claim 3, wherein the decision engine is capable of causing the decision module to alter the displayed offers, the displayed order or combinations thereof.

7. An offer prioritization system according to claim 1, wherein the end user receiving module comprises of a traffic optimizer and is capable of regulating traffic of end users from one or more referral sites.

8. An offer prioritization system according to claim 7, wherein the traffic optimizer is a traffic decision engine capable of comparing the referral site of the end user to the referral site of one or more previous end users and producing a traffic result for the end user based upon the comparison.

9. An offer prioritization system according to claim 8, wherein the traffic optimizer is capable of using the time, number of previous end users from the referral site, conversions of the previous end users from the referral site, the auto-priority module, the decision module, the inventory element, the decision engine or combinations thereof, to produce the traffic result.

10. An offer prioritization system according to claim 1, wherein the decision module further comprises a set point, the set point comprises a number offers displayed to the end user and the decision module will set the displayed offers after the set point to the offers with the highest payout factor available to the end user.

11. An offer prioritization system according to claim 10, wherein the set point is equal to six.

12. A method for prioritizing offers comprising:
    storing one or more offers for and information associated with the offers;
    determining displayed offers and a display order, the displayed offers are the offers to be displayed to the end user, and the display order is the order in which the displayed offers are to be shown to the end user; wherein the determining considers the data associated with the offers, the rank, a result from a decision engine, or combinations thereof to determine what offers are displayed to the end user and in what order;

ranking the one or more offers based upon one or more auto-priority factors; wherein the auto-priority factors comprise a business priority factor, a payout factor, a conversion element and an inventory element; ranking the one or more offers assigns each offer a rank;

regulating the end user's access;

receiving input data from the end user; and displaying the displayed offers in the display order;

wherein the conversion element is based upon the previous number of times the offer is displayed and the number of successful conversions of that offer, and wherein the conversion element takes into account the offer's one or more positions in previous display orders to end users.

13. A method for prioritizing offers according to claim 12, wherein the decision engine comprises of a demographic decision engine, a selection decision engine or a combination thereof, and the result comprises of a demographic result, a selection result or combinations thereof;

the demographic engine compares the input data of the end user to one or more previous end users' input data and produces the demographic result for the end user based upon the comparison; and the selection decision engine compares the selections of the end user to one or more previous end user's selections and produces the selection result; and wherein the decision engine makes the comparison or comparisons in real-time, according to a predetermined schedule or upon the happening of an event.

14. A method for prioritizing offers according to claim 13, wherein the result alters the displayed offers, the display order or combinations thereof.

15. A method for prioritizing offers according to claim 12, wherein the regulating of the end user's access is done by a traffic optimizer; and the traffic optimizer manages traffic of end users from one or more referral sites and restricts the end user's access.

16. A method for prioritizing offers according to claim 15, wherein the traffic optimizer denies the end user access.

17. A method for prioritizing offers according to claim 15, wherein the traffic optimizer comprises of a traffic decision engine; the traffic decision engine compares the referral site of the end user to the referral site of one or more previous end users and producing a traffic result for the end user based upon the comparison;

wherein the traffic decision engine considers a traffic result uses the time, number of previous end users from the referral site, conversions of the previous end users from the referral site, the auto-priority module, the decision module, the inventory element, the decision engine or combinations thereof, to produce the traffic result.

18. A method for prioritizing offers according to claim 12, further comprising a set point, the set point comprises a number of offers displayed to the end user; wherein after the set point of offers is displayed to the end user, the display order will display the offers that are available to the end user in the order of highest payout factor to the lowest payout factor.

19. A method for prioritizing offers according to claim 18, wherein the set point is equal to six.

* * * * *